United States Patent
Cao et al.

(10) Patent No.: US 6,292,471 B1
(45) Date of Patent: Sep. 18, 2001

(54) POWER CONTROL FOR MOBILE WIRELESS COMMUNICATION SYSTEM

(75) Inventors: Qiang Cao, Swindon; Lorenz Fred Freiberg, Grange Park; David Jonathan Reader, London, all of (GB)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/182,032

(22) Filed: Oct. 29, 1998

(30) Foreign Application Priority Data

Oct. 31, 1997 (GB) .................................. 97308744

(51) Int. Cl.⁷ .......................................... H04B 1/00
(52) U.S. Cl. ........................ 370/252; 455/69; 455/522
(58) Field of Search ............................ 370/338, 337, 370/389, 320, 335, 342, 252; 375/200, 130; 455/422, 450, 522, 69

(56) References Cited

U.S. PATENT DOCUMENTS

| | | | |
|---|---|---|---|
| 5,204,970 | 4/1993 | Stengel et al. | 455/69 |
| 5,455,967 | * 10/1995 | Amezawa et al. | 455/69 |
| 5,564,075 | * 10/1996 | Gourgue | 455/69 |
| 5,590,409 | * 12/1996 | Sawahashi et al. | 455/69 |
| 5,604,730 | 2/1997 | Tiedemann, Jr. | 370/252 |
| 5,623,484 | 4/1997 | Muszynski | 370/335 |
| 5,623,486 | * 4/1997 | Dohi et al. | 455/69 |
| 5,802,465 | * 9/1998 | Hamalainen et al. | 455/403 |
| 5,806,003 | * 9/1998 | Jolma et al. | 455/522 |
| 5,832,368 | * 11/1998 | Nakano et al. | 455/63 |
| 5,839,056 | * 11/1998 | Hakkinen | 455/69 |
| 6,028,851 | * 2/2000 | Persson et al. | 370/335 |
| 6,085,107 | * 7/2000 | Persson et al. | 455/69 |

FOREIGN PATENT DOCUMENTS

| | | | |
|---|---|---|---|
| 0 682 418 A2 | 5/1995 | (EP) | H04B/7/005 |
| 0682418A2 | 11/1995 | (EP) | H04B/7/005 |

OTHER PUBLICATIONS

European Search Report, Mar. 26, 1998.

* cited by examiner

Primary Examiner—Chau Nguyen
Assistant Examiner—Phuongchau Ba Nguyen

(57) ABSTRACT

Power control mechanisms control signal strength in a mobile wireless communication systems which communicate, at least initially, over different channels. By measuring the Signal-to-Interference ratio in signals received by a receiving station and returning that information to the transmitting station, an indication of appropriate power levels at which to transmit subsequent signals is given.

5 Claims, 3 Drawing Sheets

POWER CONTROL FOR MOBILE WIRELESS COMMUNICATION SYSTEM

CROSS-REFERENCE TO RELATED APPLICATION

This application claims priority of European Patent Application No. 97308744.8, which was filed on Oct. 31, 1997.

BACKGROUND OF THE INVENTION

1. Field of The Invention

This invention relates to power control mechanisms for controlling signal strength in a Mobile Wireless Commination System, and in particular to the initial power at which signals to and from mobile end-user devices and a fixed base station should be transmitted.

2. Description of Related Art

In existing systems, a mobile end-user device seeking to initiate communication with a base station broadcasts a request signal at increasing power levels until acknowledged by the base station. Likewise, a base station pages a mobile end-user device at increasing power levels until the end-user device responds. In each situation, one broadcasting station in the communication system ramps the power until a reasonable SNR is achieved by the second receiver. This ramping of power can lead to a signalling exchange procedure which can take sometime, since typically each station is broadcasting over a different channel (particularly in cellular radio telephone systems). It can also lead to interference between mobile end-user devices and to a loss of signal quality of other users of the wireless communication system.

EP 682418 A2 describes a fast, closed loop power control for a mobile radio telecommunication system, which is directed to the steady state operation of closed loop power control. Such a system is common in "second generation" systems, which are circuit switched wireless communication systems. A closed loop functions only if both transceivers in a wireless communication link are already synchronised and exchanging information. The power control algorithm makes use of this established bi-direction link, to exchange information on power levels. The received power is measured and the information fed back to the transmitter, allowing it to adjust its power level to an optimal value.

Future wireless communications systems will support a wide range of services including packet services and, therefore, are likely to be highly dynamic. Thus, the initial set up will be increasingly important, as compared with the steady state, and reasonable power levels must be reached immediately. There is thus a need for power control mechanisms between stations in a mobile wireless communication system which functions at start up and which decreases the time taken to establish an efficient power level.

SUMMARY OF THE INVENTION

According to a first aspect of the invention there is provided a method of establishing initial power control between a first and second station in a mobile wireless communication system comprising:

transmitting from a first station a first set-up signal over a first channel within said communication system;

receiving said first signal at a second station and transmitting, in response, a second signal over a second channel within said communication system;

receiving said second signal, at said first station, and transmitting, in response, a third signal; and comprising said second signal includes a measure of the Signal-to-Interference ratio (SIR) of said first signal as received at said second station and further comprising the power of said third signal is adjusted, in response to the SIR measure included in said second signal.

According to a second aspect of the invention there is provided apparatus for establishing initial power control between a first and second station in a mobile wireless communication system comprising:

a first station in the communication system, having a transmitter for transmitting a first set-up signal over a first channel within the communication system;

a second station in the communication system, having a receiver for receiving the first signal and a transmitter for transmitting a second signal over a second channel within the communication system;

said first station having a receiver for receiving said second signal;

wherein a third signal is transmitted in response to said second signal; and comprising said second station includes means to measure the Signal-to-Interference ratio (SIR) of the first signal as received at said second station and to include the SIR measure in said second signal and further comprising said first station includes means to adjust the power of the third signal, in response to the SIR measure included in said second signal.

The third signal may include a measure of the SIR of the second signal, as received at the first station. The second station may include means to adjust the power of subsequent signals transmitted by the second station. The third signal may be transmitted over a third channel in the communication system.

The stations may broadcast additional signals over the first, second or third channels or over additional channels in the communication system. The first station may be a base station and the first channel may be a broadcast control channel (BCCH) over which a constant information signal is broadcast (the first signal). The second station may be a mobile end-user station and the second channel may be a random access channel (RACH) over which the mobile station transmits request to transmit signals (the second signal). The third signal may be a RACH request acknowledgement (RA Ack), broadcast by the base station over an associated control channel (FACH), the third channel.

Alternatively, the first channel may be a paging channel (PCH) over which the base station pages (with the first signal) the mobile station. The mobile station may respond with a page acknowledgement (Page Ack) over the random access channel (the second signal and the second channel, respectively). The base station may then respond to the Page Ack by transmitting data (the third signal) over the traffic channel (TCH), the third channel.

BRIEF DESCRIPTION OF THE DRAWINGS

An embodiment of the invention is described, by way of example, with reference to the following figures, in which.

DETAILED DESCRIPTION

Figure 1:
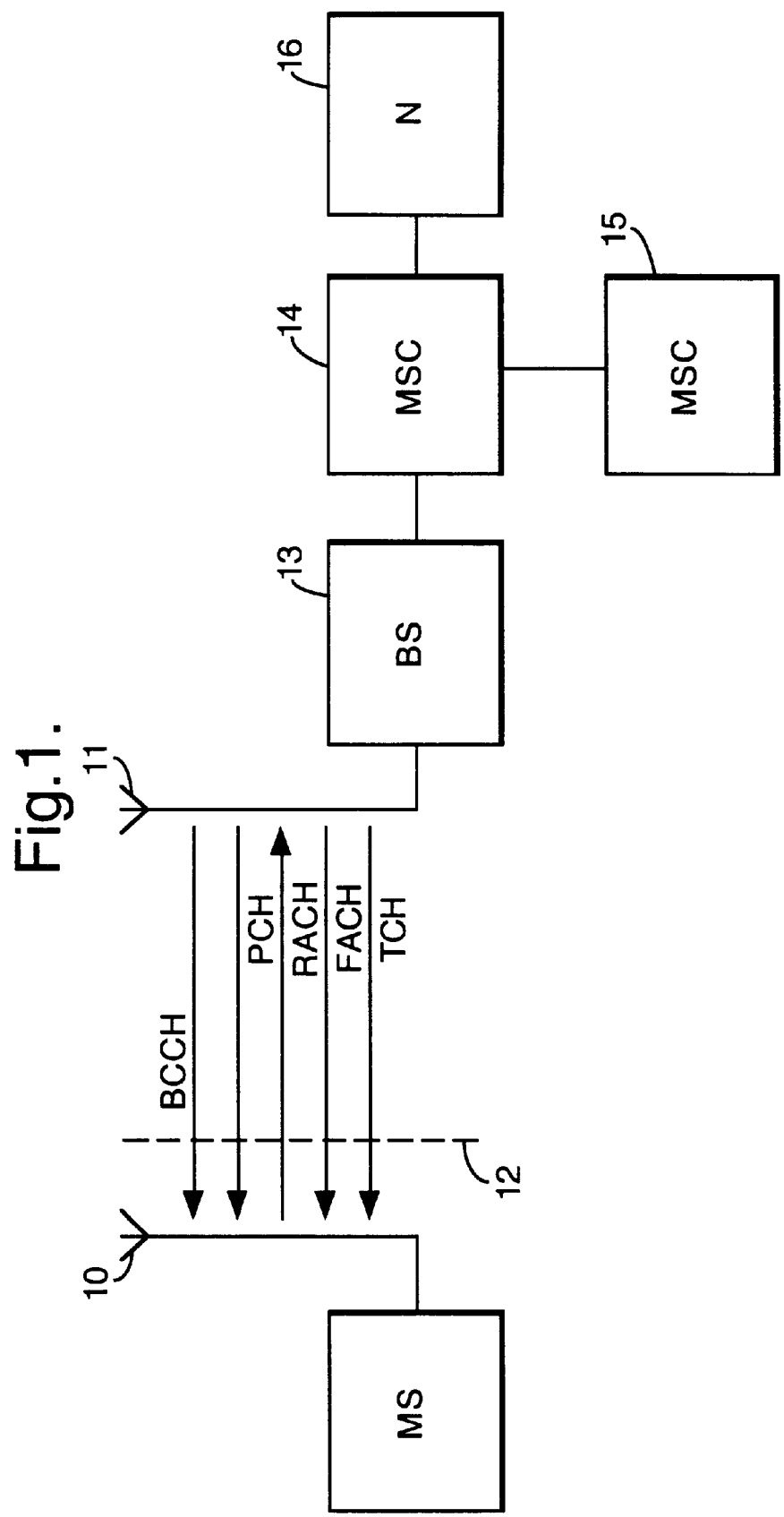
FIG. 1 shows a block diagram of a cellular mobile communication system according to the invention.

An end-user device (Mobile Station 1) may use any one of a number of communication protocols to communicate with a base station 13, via antennae 10 and 11, across an air interface 12. In the following embodiment, the communication protocol used in CDMA (code division multiple access). This enables the mobile stations to communicate using a coded spread spectrum signal with codes which are almost uncorrelated, thereby providing a multiple access communications protocol in which the collisions are not destructive of other signals broadcast concurrently. Once a communication channel has been established between mobile station 1 and its closest base station 13, the mobile switching centre 14 may establish a further connection to another mobile switching centre 15 or to the public voice or data networks 16.

The base station continually broadcasts information on the broadcast control channel (BCCH) to all mobile stations within range. The BCCH information includes various codes and control signals necessary for a mobile station to register into the system and to determine whether handover to another base station is appropriate. The base station may page the mobile station on the paging channel (PCH) or, alternatively, the mobile station may request access to the system on the random access channel (RACH). The base station and the mobile communicate over the traffic channel (TCH), whilst the base station transmits feedback control over the forward access channel (FACH).

Figure 2:
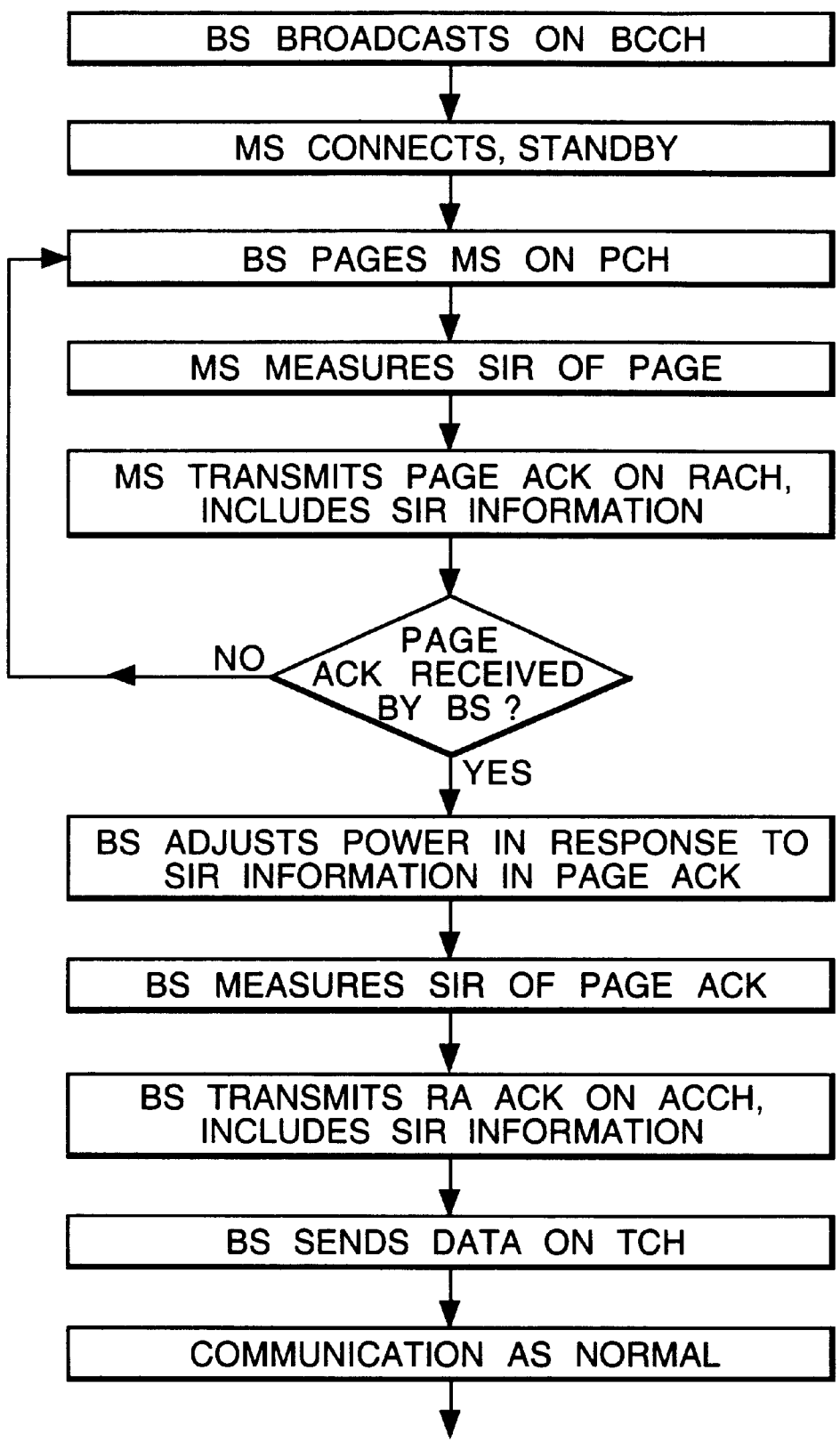
FIG. 2 shows a flow diagram of a power control mechanism according to the invention.

FIG. 2 illustrates a call to a mobile station, originated by a base station, which has arrived at the base station via the mobile switching centre. The base station pages the mobile station on the paging channel; the mobile may determine the approximate power at which to respond from the power value of the BCCH. The mobile measures the Signal-to-Interference ratio (SIR) of the paging signal and issues an acknowledgement (Page Ack) including the BCCH SIR information on the RACH. Thus the base station is immediately offered a measure of the PCH SIR and thus an indication of appropriate power levels at which to conduct further communication exchanges. The base station measures the SIR of the Page Ack and transmits information regarding the Page Ack SIR and traffic channel allocation to the mobile station on the control channel (ACCH) in an RA Ack, at an appropriate power level. The mobile station is thus given an indication of an appropriate power level at which to initiate communication exchanges. Communication may then commence over the traffic channel (TCH) and, as is known from the art, additional control bits on either the FACH or in the TCH or both may indicate that a station should increase or decrease signal power.

Figure 3:
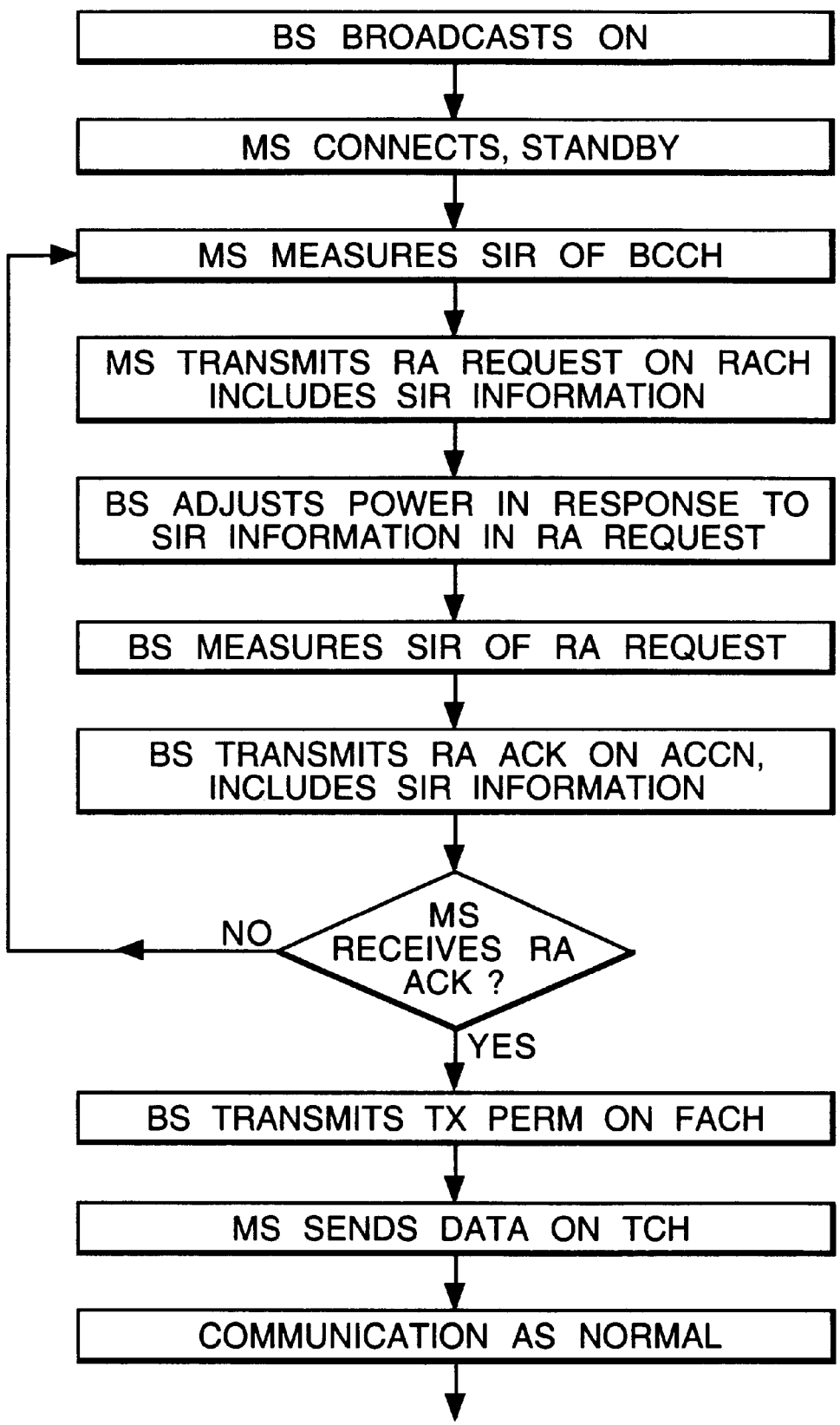
FIG. 3 shows another flow diagram of a power control mechanism according to the invention.

FIG. 3 illustrates a call originated by a mobile station, to a base station. The mobile station measures the SIR of the BCCH signal before initiating the call by requesting to transmit a packet. The request is sent by the mobile station on the RACH and includes information on the BCCH SIR measure. If the RACH request is received by the base station, the base station decodes the request, extracting the SIR information and is thereby given an indication of an appropriate power level at which to transmit further signals on other channels. The base station also measures the SIR of the RACH request and includes this information in the RACH request acknowledgement (RA Ack) transmitted on the FACH. The mobile station is thereby given an indication of an appropriate level at which to transmit further signals, particularly on the traffic channel. The base station transmits a transmit permission (Tx Perm) on the FACH and the mobile station replies by sending the first data packet on the TCH.

The foregoing is illustrative of the invention and similar embodiments would be apparent to one skilled in the art. For example, another communications protocol, such as TDM or FDMA may be used. The invention may be used in initiating other types of communication between stations in a communications system.

What is claimed is:

1. A method of establishing initial power control between a base station and mobile end user station in a mobile wireless communication system comprising:

transmitting from the base station a constant information signal over a broadcast control channel (BCCH) within said communication system;

receiving said constant information signal at a mobile end user station;

measuring, at the mobile end user station, the Signal-to-Interference ration (SIR) of the received constant information signal;

transmitting from the mobile end user station, a request to transmit signal over a random access channel (RACH) within said communication system, said request to transmit signal including the measurement of the SIR of said constant information signal as received at said mobile end user station;

receiving said request to transmit signal at said base station; and transmitting, in response thereto, a third signal, the power of said third signal being immediately adjusted to an appropriate level indicated by the measurement of the SIR of said constant information signal included in said request to transmit signal.

2. The method of claim 1 wherein the third signal is a RACH request acknowledgement (RA Ack), over an associated control channel (FACH).

3. The method of claim 1 wherein the stations broadcast additional signals over the broadcast control channel, random access channel or said associated control channel.

4. A method of establishing initial power control between a base station and a mobile end user station in a mobile wireless communication system comprising:

transmitting from the base station a paging signal over a paging (PCH) channel within said communication system;

receiving said paging signal at the mobile end user station;

measuring, at the mobile end user station, the Signal-to-Interference ratio (SIR) of the received paging signal;

transmitting, from the mobile end user station, a page acknowledgment (Page Ack) signal over a random access channel within said communication system, said page acknowledgement signal including the measurement of the SIR of said paging signal as received at said mobile end user station;

receiving said page acknowledgement signal at said mobile end user station; and transmitting, in response thereto, a third signal, the power of said third signal being immediately adjusted to an appropriate level indicated by the measurement of the SIR of said paging signal included in said page acknowledgement signal.

5. The method of claim 4 wherein a third channel is a traffic channel (TCH), and the base station responds to the Page Ack by transmitting data using the third signal over the third channel.

* * * * *